United States Patent [19]

Bartholomew

[11] Patent Number: 5,179,922
[45] Date of Patent: Jan. 19, 1993

[54] APPARATUS FOR DETERMINING CHANGE OF FUEL FLOW

[75] Inventor: Donald D. Bartholomew, Mt. Clemens, Mich.

[73] Assignee: Proprietary Technology, Inc., Mt. Clemens, Mich.

[21] Appl. No.: 614,592

[22] Filed: Nov. 15, 1990

[51] Int. Cl.$^5$ ............................................. F02B 77/00
[52] U.S. Cl. ............................ 123/198 DB; 73/40.5 R; 137/459
[58] Field of Search ............ 123/198 D, 198 DB, 381, 123/387, 514, 446, 497, 378, 385, 479; 137/101.19, 459, 557; 73/40, 40.5 R, 49.1

[56] References Cited

U.S. PATENT DOCUMENTS

| | | | |
|---|---|---|---|
| 2,936,747 | 5/1960 | Krol | 123/198 D |
| 3,664,357 | 5/1972 | Kreiss | 73/40.5 R |
| 3,667,285 | 6/1972 | Wright et al. | 73/40.5 R |
| 3,695,094 | 10/1972 | Hulme | 73/40.5 R |
| 4,090,179 | 5/1978 | Hirano | 73/40.5 R |
| 4,404,842 | 9/1983 | Mooney | 73/40.5 |
| 4,462,249 | 7/1984 | Adams | 73/40.5 |
| 4,552,015 | 11/1985 | Emmett et al. | 73/113 |
| 4,683,854 | 8/1987 | Goulet | 123/198 D |
| 4,739,648 | 4/1988 | Horner | 73/49.2 |
| 4,781,057 | 11/1988 | Hyfantis, Jr. et al. | 73/49.2 |
| 4,807,464 | 2/1989 | Janotta | 73/49.2 |
| 4,811,711 | 3/1989 | Stumpp et al. | 123/387 |
| 4,813,269 | 3/1989 | Brown et al. | 73/49.2 |
| 4,827,762 | 5/1989 | Hasselmann | 73/49.2 |
| 4,835,521 | 5/1989 | Andrejasich et al. | 340/521 |
| 4,848,150 | 7/1989 | Baird et al. | 73/296 |
| 4,873,863 | 10/1989 | Bruhl et al. | 73/49.2 |
| 4,876,530 | 10/1989 | Hill et al. | 340/605 |

FOREIGN PATENT DOCUMENTS

| | | | |
|---|---|---|---|
| 0011329 | 5/1980 | European Pat. Off. | 137/459 |
| 2436880 | 5/1980 | France | 123/198 D |
| 62-39741 | 7/1987 | Japan | 73/40.5 R |
| 830333 | 5/1981 | U.S.S.R. | 137/459 |

Primary Examiner—Noah P. Kamen
Attorney, Agent, or Firm—Harness, Dickey & Pierce

[57] ABSTRACT

This invention discloses a device by which fuel flow within a pressurized fuel system can accurately be measured to determine if the flow of fuel falls within an acceptable range. If the device detects that the fuel flow is not within normal operating ranges of the fuel system, then the device will provide a warning indication that a malfunction or fuel leakage is present in the fuel system or shut off power to the fuel pump providing the flow of fuel. The detection device can either be a device which detects the actual flow of the through the fuel line, or a device which detects the pressure within the fuel line. By this invention, a pending malfunction, such as fuel filter blockage or leaking fuel line, can be ascertained before the malfunction becomes a serious problem.

21 Claims, 2 Drawing Sheets

APPARATUS FOR DETERMINING CHANGE OF FUEL FLOW

BACKGROUND OF THE INVENTION

This invention is drawn to an apparatus for sensing changes in flow of a fluid, and more specifically, an apparatus for sensing changes in flow of fuel through a pressurized automotive fuel system.

Current automotive or vehicular fuel systems provide pressurized fuel from the fuel tank to the vehicle's engine. Generally, these fuel systems include a fuel pressure regulator to control the pressure of the fuel through the fuel system. To enable the pressure regulator to maintain good fuel regulation, and to keep the fuel operating temperature at a minimum, a substantial amount of excess fuel is supplied to the engine from the fuel tank than is actually used by the engine. The fuel which is not used by the engine is subsequently returned back to the fuel tank.

Since the automotive fuel system includes a fuel line from the fuel tank to the engine, and a fuel line from the engine back to the fuel tank, as well as a variety of fuel system components along the way, there are a number of places where fuel system integrity could be breached and cause fuel leakage, especially since the fuel system is pressurized. Further, catastrophic loss of fuel system integrity as a result of collisions or the like provides additional concerns. For many obvious reasons, leakage of fuel from the fuel system could cause a number of serious problems. Current automotive fuel systems incorporate clips, latches, or check valves at the connections between the fuel lines and the different components to prevent fuel leakage by increasing the durability of the fuel system. Although these devices provide additional integrity against the leakage of fuel from the fuel system, they add a certain amount of excessive cost to the fuel system, and further, cannot provide an indication of leakage within the fuel system if it happens to occur. Moreover, these devices do not provide safety mechanisms in the event of catastrophic fuel system leakage, such as may occur from an automobile accident or the like. In addition, current automotive fuel systems do not provide adequate means for determining certain malfunctions of the fuel system components.

What is needed then is an automotive fuel system incorporating means for providing an indication of loss of fuel system integrity from either fuel leakage within the fuel system or other fuel system component malfunction, and to stop the fuel pump in the event of catastrophic loss of fuel system integrity. It is therefore an object of this invention to provide such a means.

SUMMARY OF THE INVENTION

According to a preferred embodiment of this invention, a device is incorporated at a strategic point or strategic points along the fuel line of a pressurized fuel system which is sensitive to the flow of fuel through the line. Ideally, a single device will be placed at a position proximate the fuel tank on a return fuel line from the engine to the fuel tank. This position enables the device to detect fuel leakage along most of the entire length of the fuel system. If the device detects a decrease or increase in the flow of fuel through the return fuel line, it can activate a warning signal provided at a desirable location, or can switch off the fuel pump providing the fuel pressure completely in the event of a major malfunction. Since many automotive fuel systems today incorporate a computerized fuel system for delivering an accurate amount of fuel to the engine, the fuel flow sensing device can be calibrated to relatively small changes in fuel flow, and thus be triggered by minor changes in fuel flow which may anticipate major problems about to occur.

The fuel flow detection device can either, according to preferred embodiment of this invention, be a device which measures the actual fuel flow through the device, or a device which measures a change in pressure drop within the device. The accuracy of the system enables the fuel flow measuring device to detect leakage within the system, blocked fuel filters, malfunctioning regulators, or air trapped in the fuel system, as well as other breaches in fuel system integrity.

Additional objects, advantages, and features of the present invention will become apparent in the following description and appended claims, taken in conjunction with the accompanying drawings.

DETAILED DESCRIPTION OF THE INVENTION

The following description is merely exemplary in nature and is in no way intended to limit the invention or its application or uses.

Figure 1:
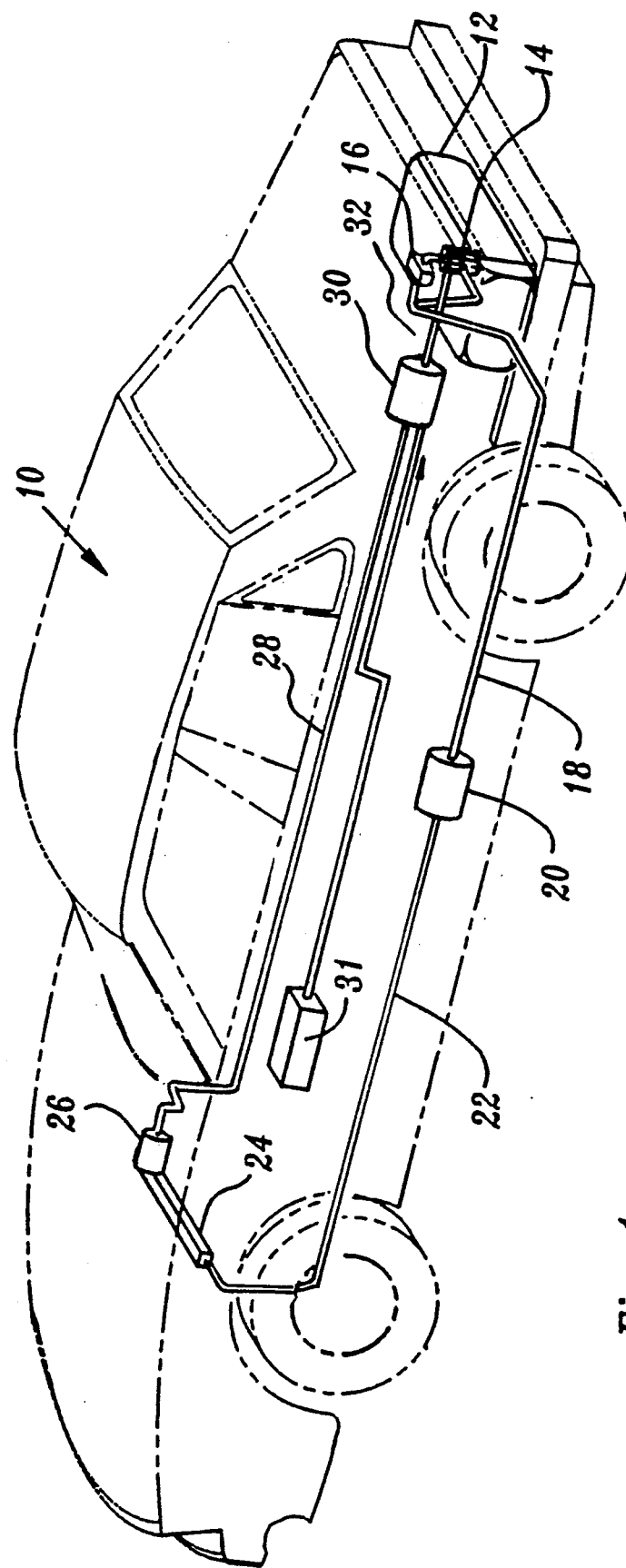
FIG. 1 is an automotive fuel system incorporating a fuel flow detection device according to a preferred embodiment of this invention.

FIG. 1 shows generally an automotive fuel system 10 incorporating a fuel flow detection device 30 according to a preferred embodiment of this invention. Fuel system 10 includes a fuel tank 12 generally located near the rear of the automobile as shown in phantom. Fuel tank 12 can take a variety of different shapes, sizes and locations to accommodate the designs of different automobiles. Located within fuel tank 12 is a fuel pump 14 for providing pressurized fuel to the engine (not shown) of the automobile. Fuel pump 14 is connected to an adapter 16 positioned on an outer surface of fuel tank 12. A first fuel inlet tube 18 is connected at one of its ends to adapter 16. Fuel inlet tube 18 is connected at its other end to an inlet end of a fuel filter 20 as is well known in the art. Attached to an outlet end of fuel filter 20 opposite first fuel inlet tube 18 is a second fuel inlet tube 22. Second fuel inlet tube 22 is connected at its other end opposite fuel filter 20 to a fuel rail 24. Fuel rail 24 is generally elongated in shape, and provides fuel to the cylinders of the automobile by means (not shown) well known in the art. Attached to an end of fuel rail 24 opposite second fuel inlet tube 22 is a fuel pressure regulator 26. Fuel leaving fuel rail 24 is introduced into fuel pressure regulator 26. A first fuel outlet tube 28 is connected at one end to fuel pressure regulator 26 and at its other end to fuel flow detection device 30. At an end of fuel detection device 30 opposite first fuel exit tube 28 is a second fuel exit tube 32. Second fuel exit tube 32 is connected to adapter 16 at its other end. Therefore, the fuel system components as shown in FIG. 1 provide a loop for fuel to leave fuel tank 12, and then return to it. The parameters of each of the fuel tubes 18, 22, 28 and 32, the fuel filter 20, the fuel rail 24, the fuel pressure regulator 26, the adapter 16, the fuel pump 14 and the fuel tank 12 are determined by the different operating characteristics of the specific automobile in which they are incorporated as is well known in the art. Further, other fuel system components not specifically disclosed here can be incorporated into fuel system 10.

In operation, a signal supplying power applied to fuel pump 14 by means not shown, such as a signal from the ignition system of the automobile, instructs the fuel pump 14 to pump fuel from fuel tank 12 into first fuel inlet tube 18 through adapter 16. The pressure, amount and rate of the fuel pumped from fuel tank 12 by fuel pump 14 is also determined upon the different operating characteristics of the specific automobile in which they are used. Fuel leaving fuel tank 12 is directed along first inlet tube 18 by means of adapter 16. As fuel travels down first inlet tube 18 towards the engine it encounters fuel filter 20. Fuel filter 20 removes impurities and the like trapped in the fuel by means well known to those skilled in the art. Fuel leaving fuel filter 20 is then directed along second inlet tube 22. Second inlet tube 22 directs the fuel into fuel rail 24. Fuel rail 24 supplies fuel to fuel injectors which in turn supply the necessary or predetermined amount of fuel to the engine by means also well know to those in the art. The pressure and amount of fuel available from fuel rail 24 is determined by fuel pressure regulator 26. Fuel pressure regulator 26 enables the fuel pressure to be maintained in the input portion of the fuel system 10 and to be applied to the engine at a desirable amount. To provide accurate regulation of the fuel to enable efficient engine performance, the pressure regulator 26 requires substantially more fuel than what is actually used by the engine. Further, excess fuel pumped through the fuel system 10 provides a method of keeping the operating temperature of the fuel at a minimum. The excess fuel supplied to the fuel rail 24 leaves fuel regulator 26 through first outlet tube 28. The excess fuel travels through first outlet tube 28 until it reaches fuel flow detection device 30 according to a preferred embodiment of this invention. Fuel flow detection device 30 detects the amount of fuel traveling through first outlet tube 28 to second outlet tube 32 as will be described hereunder. Second outlet tube 32 returns the excess fuel back to fuel tank 12 through adapter 16 to be pumped back through the fuel system 10.

Fuel flow detection device 30 provides a means for determining fuel leakage or fuel component malfunction within the fuel system 10. Any significant change in fuel flow will be interpreted by detection device 30 as a loss of fuel system integrity, such that appropriate service can be rendered to the fuel system 10. Detection device 30 includes computer means 31 to shut pump 14 off entirely in the event of a catastrophic fuel system failure from events such as an accident or collision. Therefore, many different fuel system malfunctions can be assessed and remedied quickly and efficiently before a costly or dangerous situation arises. In addition, detection device 30 eliminates the need for costly devices for preventing fuel leakage.

Ideally, fuel flow detection device 30 is positioned as close as possible to fuel tank 12 on the return side of fuel system 10. In other words, first fuel outlet tube 28 is made as long as possible, and second fuel outlet tube 32 is made as short as possible. By this configuration, fuel flow detection device 30 can detect the flow of fuel which has traveled through almost the entire length of fuel system 10, thus enabling it to detect loss of fuel system integrity at nearly every location of fuel system 10. In addition, fuel flow detection device 30 can be used at alternate desirable locations such as in liner 18 or 22, or at a multiplicity of locations to isolate certain fuel system components, such as the fuel pump 14. Therefore if fuel flow detection device 30 detects a decrease or increase in fuel flow the malfunctioning components can be quickly identified. For a fuel flow detector isolating the fuel pump, its most desirable location would be along first fuel inlet line 18, as close to adapter 16 as possible.

Many automotive fuel systems today incorporate a computerized fuel system for applying an accurate amount of fuel to the engine of the automobile and continuously monitoring this amount, thus enhancing efficiency of operation of the vehicle. Therefore, these computerized fuel systems enable an acceptable amount of fuel to be applied to the engine within a narrow range. Since the computerized fuel system will monitor the amount of fuel being used by the engine, the computer can compare this amount to the flow of fuel through detection device 30. It follows then that fuel flow detection device 30 can be calibrated to respond to a small change in fuel flow which is not caused by the computer control. By this, detection device 30 can respond to relatively small leaks within the fuel system, early detection of blockage of fuel filter 20, or small malfunctions with fuel pump 14, etc. Therefore, the fuel system can be serviced before a serious malfunction occurs.

Electrical leads from fuel flow detection device 30 can be connected to a warning system, such as an indicator light on the dashboard of the automobile, to indicate malfunctions of the fuel system. Further, fuel flow detection device 30 can be electrically connected to fuel pump 14 or an electrical component (not shown) which controls fuel pump 14, such that fuel flow detection device 30 can shut down fuel pump 14 in the event of a major malfunction.

Figure 2A:
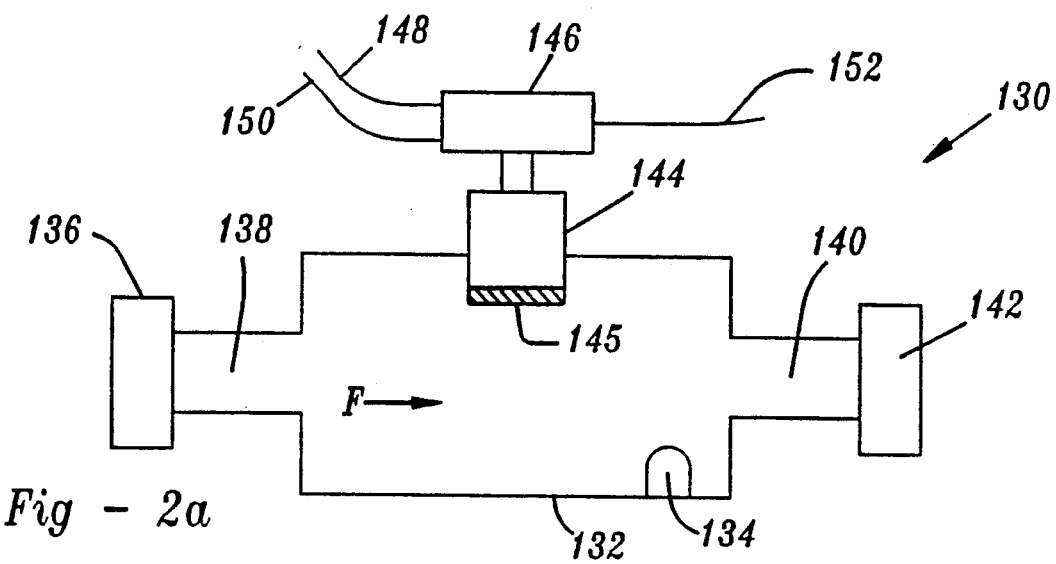
FIG. 2A is a fuel flow detection device according to a preferred embodiment of this invention incorporating a pressure transducer.

FIG. 2A shows a certain type of fuel flow detection device 130 which can be incorporated in fuel system 10 of FIG. 1 as device 30. Detection device 130 detects the flow of fuel by measuring a change in pressure drop within the detection device 130. Fuel flow detection device 130 includes a main chamber 132 having an entrance chamber 138 at one end and an exit chamber 140 at the other end. Attached to entrance chamber 138 is an entrance connection 136 for connecting chamber 138 to a fuel tube of the fuel system. Exit chamber 140 includes exit connection 142 for connecting chamber 142 to a fuel tube at the opposite end of chamber 132. The flow of fuel through chamber 132 is indicated by the arrow labeled F. If fuel detection device 130 is used as detection device 30 of FIG. 1, entrance connection 136 will be connected to fuel tube 28 and exit connection 142 will be connected to fuel tube 32.

Positioned within chamber 132 of fuel detection device 130, proximate the end closest to exit chamber 140, is a pressure increasing means 134. Pressure increasing means 134 is generally a structure of rigid material traversing part of the width of chamber 132 perpendicular to the flow of the fuel through chamber 132, as shown.

Located substantially opposite pressure increasing means 134 is pressure transducer 144. Pressure transducer 144 has a pressure sensitive end 145 located within chamber 132. The opposite end of transducer 144 extends out of chamber 132 at an upper location. Connected to the end of pressure transducer 144 opposite pressure sensitive end 145 by means of electrical leads is an electrical signaling device 146 for interpreting electrical signals from pressure transducer 144. Electrical device 146 includes electrical leads 148, 150, and 152. Generally, electrical lead 148 will provide power to pressure transducer 144. Electrical lead 150 will provide a signal line to indicate an unacceptable pressure drop within chamber 132. And electrical lead 152 will be connected to fuel pump 14 to switch it off in certain situations of substantial pressure drop.

In operation, fuel will enter inlet chamber 138 through entrance connection 136. The fuel will continue to flow through inlet chamber 138 and then into chamber 132. When the fuel encounters pressure increasing means 134 it is deflected transverse to the normal flow of fuel causing a pressure increase within chamber 132 which is read by the pressure sensitive end 145 of pressure transducer 144. In normal operation, electrical signalling device 146 will interpret this pressure as an acceptable pressure. The fuel continues to flow out of chamber 132 through exit chamber 140 and out through exit connection 142. A change of flow through chamber 132 will be read as a change in the pressure within the chamber caused by pressure increasing means 134. If the pressure changes, whether it be an increase in pressure or a decrease in pressure, pressure transducer 144 will emit an electrical signal indicative of this change to electrical signalling device 146. Electrical device 146 will interpret this signal as being within an acceptable range. If the signal from pressure transducer 144 indicates an unacceptable pressure, electrical device 146 can either emit an electrical signal along line 150 to a warning system, or along line 152 to shut down fuel pump 14 or both.

Figure 2B:
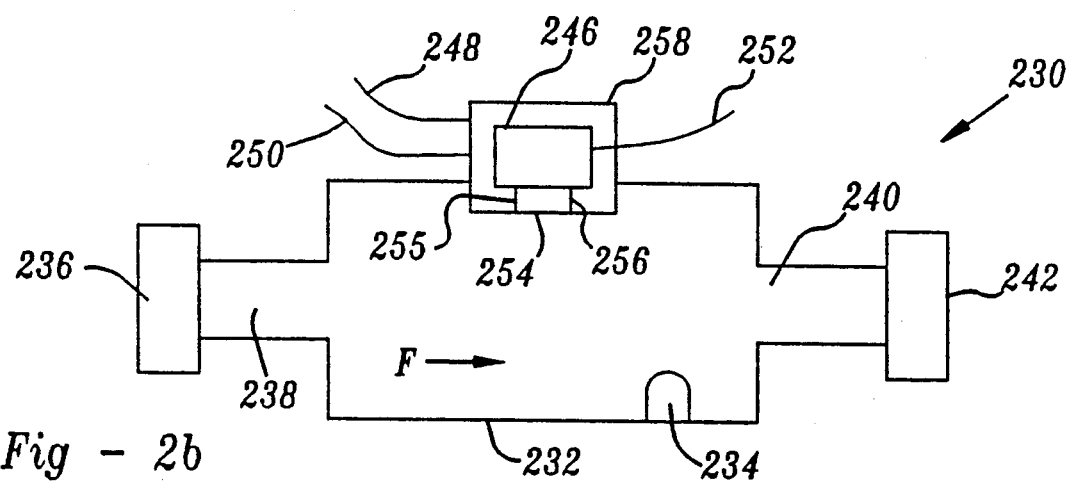
FIG. 2B is a fuel flow detection device according to a preferred embodiment of this invention incorporating a pressure detecting diaphragm.

FIG. 2B shows a similar fuel flow detection device 230 to that of detection device 130 of FIG. 2A. Fuel flow detection device 230 also includes a main chamber 232 having an inlet chamber 238 and an outlet chamber 240. Entrance connection 236 for connecting a fuel tube to inlet chamber 238 is positioned at one end of fuel flow detection device 230, and exit connection 242 for connecting outlet chamber 240 to a fuel tube is positioned at an opposite end of fuel flow detector 230. Positioned within main chamber 232 is a pressure increasing means 234 as described above. The pressure increasing means 234 causes a pressure increase in main chamber 232 as disclosed above for pressure increasing means 134. This time, however, the change in pressure is detected by a diaphragm 254 located at one end of a chamber 258 at an opposite side of main chamber 232. Chamber 258 is positioned in a wall of main chamber 232 such that it extends partially within chamber 232 and partially out of chamber 232. Diaphragm 254 comprises a wall of chamber 258. Within chamber 258 is an electrical signalling device 246 similar to that of electrical signalling device 146 of FIG. 2A. Electrical leads 248, 250, and 252 serve the same function in fuel flow detection device 230 as they do in fuel flow detection device 130, as described above. Diaphragm 254 will respond to the pressure within chamber 232 caused by pressure increasing means 234. If a change in pressure occurs within chamber 232, diaphragm 254 will indicate this along lines 255 and 256 attached to electrical signalling device 246. Electrical indicator signalling device 246 will determine if this change in pressure is outside of an acceptable range, and if so will provide a warning signal or shut off fuel pump 14, as described above. It may be desirable to have device 246 transmit the signal indicative of the fuel flow to a device remote from fuel flow detection device 230, such as a computer, to determine what action will be taken concerning the flow of fuel.

Figure 3:
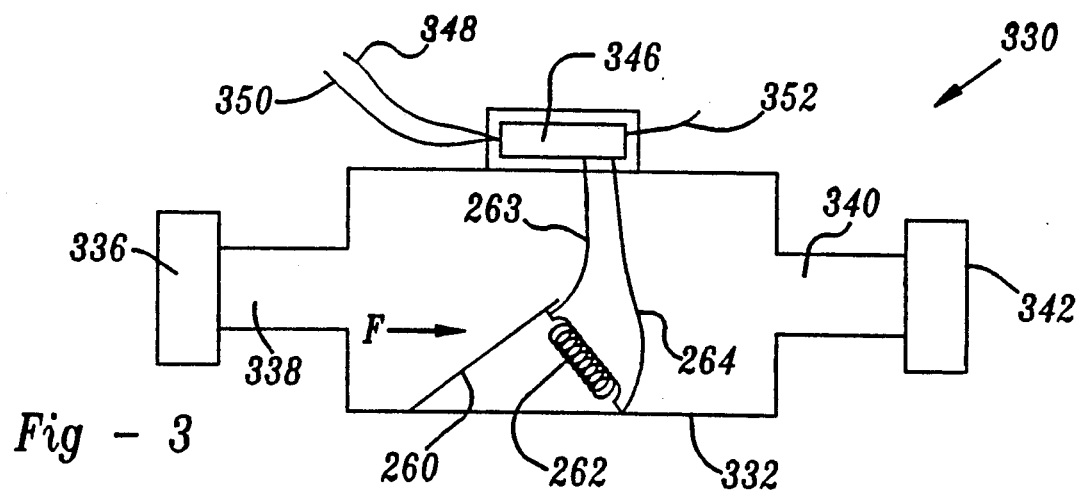
FIG. 3 is a fuel flow detection device according to a preferred embodiment of this invention incorporating a flow detector.

FIG. 3 shows a fuel flow detection device 330 incorporating a means for detecting the actual flow of fuel through the detection device 330 Fuel flow detection device 330 includes a main chamber 332 having an inlet chamber 338 and an exit chamber 340. An entrance connection 336 for connecting inlet chamber 338 to a fuel tube and an exit connection 342 for connecting chamber 340 to an exit fuel tube is also included, as described above. Included within main chamber 332 is a flow detection means 260 incorporating a spring biasing means 262 for measuring the flow of fuel through chamber 332. As fuel flows through chamber 332, fuel flow detection means 260 applies a force proportional to the rate of flow against spring biasing means 262. Spring biasing means 262 emits an electrical signal along lines 263 and 264 relative to the amount of compression in the spring means 262. Electrical lines 263 and 264 are connected to an electrical indicator device 346, as described above. Electrical leads 348, 350, and 352 have the same functions as electrical leads 150, 148 and 152, or 248, 250 and 252, above. Therefore, changes in the flow of fuel through fuel detector 330 can be accurately determined.

Certain automotive fuel system operations would provide a situation in which the fuel flow through the fuel system is not at normal operating flow. Specifically, at engine start-up there may be certain fluctuations in the fuel flow, which would not necessarily indicate a malfunction or fuel leakage. It would, therefore, be desirable to include certain delays or acceptances in the fuel flow detectors described above, such that the detectors would not indicate a malfunction is present when it actually was not. In computerized fuel systems, it would be relatively easy to program many characteristics of the fuel system which may be encountered without necessarily meaning a malfunction of the system.

This invention describes an efficient and practical means for warning of fuel system malfunctions or pending malfunctions. Providing such a device to detect malfunctions, as well as fuel line leakage, negates the need for providing redundant or extraordinary measures for insuring fuel system integrity. Therefore, this invention eliminates many costly additives to the fuel system.

The foregoing discussion discloses and describes merely exemplary embodiments of the present invention. One skilled in the art will readily recognize from such discussion, and from the accompanying drawings and claims, that various changes, modifications and variations can be made therein without departing from the spirit and scope of the invention as defined in the following claims.

What is claimed is:

1. A fuel system comprising:
   a fuel tank for holding a certain quantity of fuel;
   at least one fuel line connected to said fuel tank; and
   means for determining a total flow of fuel through said at least one fuel line relative to a predetermined value, at a single point, so as to indicate a malfunction of the total fuel flow in said fuel system.

2. The fuel system of claim 1, wherein the means for determining flow is a device for determining the actual total flow of fuel.

3. The fuel system of claim 1 wherein said at least one fuel line is an inlet line connected to the fuel tank and an engine and an outlet line also connected to the fuel tank and the engine, and said means for determining flow is positioned on said outlet line proximate said fuel tank, wherein fuel flows from said fuel tank through said inlet line and from the engine through said outlet line to said fuel tank.

4. The fuel system of claim 1 wherein the means for determining flow include means for providing a warning signal.

5. The fuel system of claim 1 wherein the means for determining flow includes means for terminating flow of fuel.

6. The fuel system of claim 5 wherein the means for terminating flow of fuel is a means for electrically shutting off a fuel pump providing fuel to the fuel system.

7. The fuel system of claim 1 further comprising a fuel pressure regulator said regulator located between said inlet line and said outlet line and a fuel pump, said fuel pump positioned within the fuel tank.

8. The fuel system of claim 1 further comprising a fuel filter positioned on said at least one fuel line.

9. A fuel system for a vehicle comprising:
a fuel tank for holding a certain quantity of fuel;
a supply fuel line directing fuel from said fuel tank to a vehicle engine;
a return fuel line directing fuel from the engine back to the fuel tank;
a fuel pump positioned within the fuel tank for pumping fuel into the supply fuel line;
a pressure regulator for regulating the fuel pressure in the fuel system; and
means for measuring the flow of fuel through the return fuel line proximate the fuel tank, at a single point, so as to sense the fuel flow rate relative to a predetermined value and provide information relating to an abnormal fuel flow condition anywhere in said supply and return lines.

10. The fuel system according to claim 9 wherein the means for measuring measures the actual flow of fuel.

11. The fuel system according to claim 9 wherein the means for measuring the flow of fuel includes means for electrically shutting off the fuel pump.

12. The fuel system according to claim 9 wherein the measuring the flow of fuel includes means for providing a warning signal.

13. A method for supplying fuel from a fuel tank to a fuel rail comprising the steps of:
pumping the fuel along a first fuel line between the fuel tank and the fuel rail;
measuring the flow of fuel through the first fuel line at a single point therealong; and
comparing the measured flow of fuel to the flow that would be expected during normal operation of fuel flow so as to detect a leak anywhere in said first fuel line.

14. The method of claim 13 further comprising the step of regulating the pressure along the fuel line.

15. The method of claim 13 further comprising returning fuel along a second fuel line from the engine to the tank and measuring the flow of fuel along the second fuel line proximate the fuel tank.

16. The method of claim 13 wherein the step of measuring includes measuring the actual flow of fuel.

17. The method of claim 13 wherein the step of measuring includes measuring the fuel pressure.

18. The method of claim 13 further comprising the step of providing a warning signal if the measured flow is outside a predetermined range.

19. The method of claim 13 further comprising the step of stopping the pumping of fuel if the measured flow is outside a predetermined range.

20. A vehicle fuel system comprising:
a fuel tank for holding a quantity of fuel;
at least one fuel line connected to said fuel tank and a fuel rail of said vehicle, for supplying said fuel to said fuel rail; and
a single fuel flow pressure detecting device disposed proximate said fuel rail to detect a fuel flow malfunction occurring anywhere in said fuel line.

21. A vehicle fuel system comprising:
a fuel tank for holding a quantity of fuel;
a fuel supply line coupled to said fuel tank and to an engine of said vehicle;
a fuel return line coupled between and to said engine and said fuel tank; and
single fuel flow sensing means disposed proximate said fuel tank in said fuel return line for sensing an actual fuel flow in said fuel supply and return lines and detecting a change in said actual fuel flow, from a predetermined amount, anywhere in said fuel supply and return lines, to thereby provide an indication of a malfunction in said fuel supply and return lines.

* * * * *